(12) United States Patent
Hsu

(10) Patent No.: US 11,995,097 B2
(45) Date of Patent: May 28, 2024

(54) SYSTEM AND METHOD FOR ELASTIC DATA INGESTION

(71) Applicant: SCHLUMBERGER TECHNOLOGY CORPORATION, Sugar Land, TX (US)

(72) Inventor: Chiao-Fang Hsu, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 7 days.

(21) Appl. No.: 17/998,570

(22) PCT Filed: May 5, 2021

(86) PCT No.: PCT/US2021/030777
§ 371 (c)(1),
(2) Date: Nov. 11, 2022

(87) PCT Pub. No.: WO2021/231141
PCT Pub. Date: Nov. 18, 2021

(65) Prior Publication Data
US 2023/0205780 A1    Jun. 29, 2023

Related U.S. Application Data

(60) Provisional application No. 63/024,551, filed on May 14, 2020.

(51) Int. Cl.
*G06F 16/25*   (2019.01)
*G06F 16/29*   (2019.01)

(52) U.S. Cl.
CPC ............ *G06F 16/258* (2019.01); *G06F 16/29* (2019.01)

(58) Field of Classification Search
CPC .............................. G06F 16/258; G06F 16/29
See application file for complete search history.

(56) References Cited

U.S. PATENT DOCUMENTS 10,394,802 B1    8/2019  Porath
11,442,765 B1 *  9/2022  Zhang ................. G06F 9/30145
(Continued)

OTHER PUBLICATIONS

Search Report and Written Opinion of International Patent Application No. PCT/US2021/030777 on Jun. 28, 2021; 10 pages.
(Continued)

*Primary Examiner* — Loc Tran
(74) *Attorney, Agent, or Firm* — Jeffrey D. Frantz

(57) ABSTRACT

An energy exploration system includes a plurality of computer nodes. Each of the computer nodes includes a processor and memory coupled to the processor. The computer nodes are configured to implement a data ingestion system configured to add a data set to the energy exploration system. The data ingestion system includes a parsing subsystem, a conversion subsystem, and a publication subsystem. The parsing subsystem includes a plurality of parser instances configured to encode records of the data set as intermediate geographical object records. The conversion subsystem includes a plurality of conversion instances configured to format the intermediate geographical object records according to a sink specific specification to produce formatted geographic object records. The publication subsystem includes a plurality of publication instances configured to export the formatted geographic object records to a designated tenant.

20 Claims, 7 Drawing Sheets

(56) References Cited

U.S. PATENT DOCUMENTS

| | | |
|---|---|---|
| 2004/0158584 A1 | 8/2004 | Necsoiu |
| 2006/0242110 A1 | 10/2006 | Goldstein |
| 2010/0179963 A1* | 7/2010 | Conner ................ G09B 29/102 |
| | | 707/769 |
| 2012/0330908 A1* | 12/2012 | Stowe ................... G06F 16/258 |
| | | 707/693 |
| 2017/0052747 A1 | 2/2017 | Cervelli |
| 2017/0357702 A1* | 12/2017 | Nikhra ................ G06F 16/2477 |
| 2020/0097491 A1 | 3/2020 | Berthiaume |

OTHER PUBLICATIONS

International Preliminary Report on Patentability of International Patent Application No. PCT/US2021/030777 on Nov. 24, 2022; 7 pages.

EP Extended Search Report; Application No. 21804949.2; Dated Apr. 16, 2024; 7 pages.

* cited by examiner

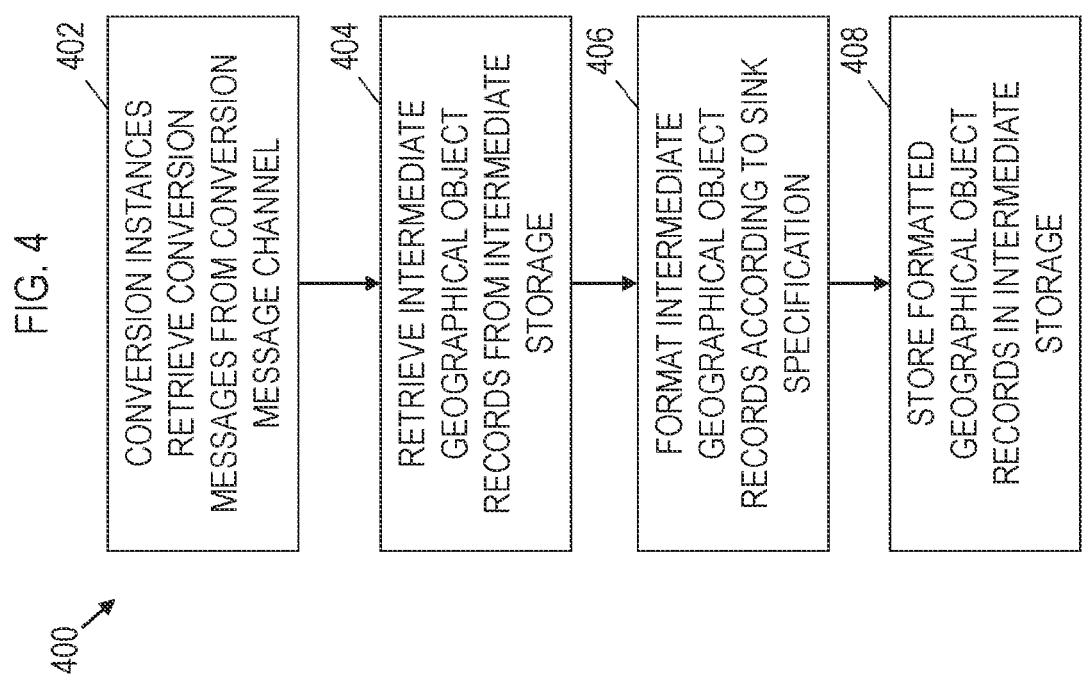

SYSTEM AND METHOD FOR ELASTIC DATA INGESTION

CROSS-REFERENCE TO RELATED APPLICATIONS

This application is a National Stage Entry of International Patent Application No. PCT/US2021/30777, filed on May 5, 2021, which claims priority to U.S. Provisional Patent Application No. 63,024,551, which was filed on May 14, 2020, and is incorporated herein by reference in its entirety.

BACKGROUND

Many different types of data are employed in the exploration for and production of energy, including hydrocarbons such as oil, gas. Modern mapping and visualization systems allow the many different types of data to be spatially displayed on a common map. For example, each type of data may be rendered as a different layer of the common map. The various types of data that may be of interest for energy exploration and production include seismic data, well data, pipeline data, platform data, field data, prospect data, leasing block data, basin data, gravity data, magnetic data, bathymetry data, etc. Before data can mapped and displayed by an energy exploration system, the data must be input to or ingested by the exploration/production system.

SUMMARY

A data ingestion system for use in an energy exploration system is disclosed herein. In one implementation, an energy exploration system includes a plurality of computer nodes. Each of the computer nodes includes a processor and memory coupled to the processor. The computer nodes are configured to implement a data ingestion system configured to add a data set to the energy exploration system. The data ingestion system includes a parsing subsystem, a conversion subsystem, and a publication subsystem. The parsing subsystem includes a plurality of parser instances configured to encode records of the data set as intermediate geographical object records. The conversion subsystem includes a plurality of conversion instances configured to format the intermediate geographical object records according to a sink specific specification to produce formatted geographic object records. The publication subsystem includes a plurality of publication instances configured to export the formatted geographic object records to a designated tenant. The parsing subsystem may include a master message channel, and one or more master instances. The one or more master instance may be configured to receive an ingestion start message, via the master message channel, to initiate ingestion of the data set. On receipt of the ingestion start message the one or more master instances may select a parsing strategy based on content of the data set, partition the data set into data subsets comprising one or more records of the data set based on the parsing strategy, and transmit a parse message for each of the data subsets to the parser instances. The parsing subsystem may include a parser message channel for receiving the parse messages transmitted by the one or more master instances, and a parser group coordinator configured to control a number of the parser instances applied to process the parse messages and encode the data set. Each of the parser instances may be configured to retrieve one of the parse messages from the parser message channel, read from the data set one of the data subsets identified in the one of the parse messages, parse each record of the one of the data subsets according to a configuration schema for the data set, encode each value parsed from the record as a value of an intermediate geographical object record, store each of the intermediate geographical object records in a first intermediate storage, and transmit a conversion message to the conversion subsystem. The conversion subsystem may include a conversion message channel for receiving the conversion message transmitted by the parser instance, and a conversion group coordinator configured to control a number of the conversion instances applied to process the conversion messages and format the intermediate geographical object records. Each of the conversion instances may be configured to retrieve a conversion message from the conversion message channel; retrieve from the first intermediate storage an intermediate geographical object record identified in the conversion message, format the intermediate geographical object record according to the sink specific specification' and store the formatted geographic object record in a second intermediate storage. The parser instances may be configured to apply a same intermediate geographical object record format to data sets having different formats. The publication subsystem may include a publication manager message channel, a publication manager instance, a publication message channel, and a publication group coordinator. The publication manager instance may be configured to retrieve a publication start message from the publication manager message channel, and transmit publication messages to the publication instances. The publication group coordinator may be configured to control a number of the publication instances applied to export the formatted geographic object records to the designated tenant.

In another implementation, a method for data ingestion includes configuring a plurality of computing nodes to provide: a parsing subsystem comprising one or more master instances and a plurality of parser instances, a conversion subsystem comprising a plurality of conversion instances, and a publication subsystem comprising a plurality of publication instances. A data set is partitioned into data subsets comprising one or more records of the data set by the one or more master instances. The records of the data set are encoded as intermediate geographical object records by the plurality of parser instances. The intermediate geographic object records are converted, by the plurality of conversion instances, according to a sink specific specification, to produce formatted geographic object records. The formatted geographic object records are exported to a designated tenant by the plurality of publication instances. The method may also include generating, by the one or more master instances, a plurality of parser messages each corresponding to one of the data subsets; storing, by the one or more master instances, the parser messages in a parser message channel; retrieving, by the plurality of parser instances, the parser messages from the parser message channel; and retrieving, by the plurality of parser instances, from the data set, the data subsets identified in the parser messages. In an implementation of the method, the encoding may include parsing each record of the data subsets according to a configuration schema for the data set; encoding each value parsed from the record of the datasubsets as a value of an intermediate geographical object record; storing each of the intermediate geographical object records in a first intermediate storage; generating a conversion message for the data subset; and storing the conversion message in a conversion message channel. In an implementation of the method, the converting may include retrieving the conversion message from the conversion message channel; retrieving, from the first intermediate storage, the intermediate geographical object record identified in the conversion message; formatting the intermediate geographical object record according to the sink specific specification; and storing the formatted geographic object record in a second intermediate storage. In an implementation of the method, the encoding may include applying a same intermediate geographical object record format to data sets having different formats. In an implementation of the method, the exporting may include retrieving a publication start message from a publication manager message channel; transmitting, by a publication manager instance, publication messages to the publication instances via a publication message channel; and retrieving, by the publication instances, the publication messages from the publication message channel.

In a further implementation, a non-transitory computer-readable medium is encoded with instructions that when executed cause one or more processors to implement a parsing subsystem that includes one or more master instances and a plurality of parser instances, a conversion subsystem that includes a plurality of conversion instances, and a publication subsystem that includes a plurality of publication instances. The one or more master instances partition a data set into data subsets comprising one or more records of the data set. The plurality of parser instances encodes the records of the data set as intermediate geographical object records. The plurality of conversion instances converts the intermediate geographic object records, according to a sink specific specification, to produce formatted geographic object records. The plurality of publication instances exports the formatted geographic object records to a designated tenant. The instructions may cause the one or more processors to generate, by the one or more master instances, a plurality of parser messages each corresponding to one of the data subsets; store, by the one or more master instances, the parser messages in a parser message channel; retrieve, by the plurality of parser instances, the parser messages from the parser message channel; and retrieve, by the plurality of parser instances, from the data set, the data subsets identified in the parser messages. The instructions may cause the one or more processors to, in each of the parser instances: parse each record of the data subsets according to a configuration schema for the data set; encode each value parsed from the record of the data subsets as a value of an intermediate geographical object record; store each of the intermediate geographical object records in a first intermediate storage; generate a conversion message for the data set; and store the conversion message in a conversion message channel. The instructions may cause the one or more processors to, in the conversion instances: retrieve the conversion message from the conversion message channel; retrieve, from the first intermediate storage, the intermediate geographical object record identified in the conversion message; format the intermediate geographical object record according to the sink specific specification; and store the formatted geographic object record in a second intermediate storage. The instructions may cause the one or more processors to, in the publication subsystem: retrieve a publication start message from a publication manager message channel; transmit, by a publication manager instance, publication messages to the publication instances via a publication message channel; and retrieve, by the publication instances, the publication messages from the publication message channel. The instructions may cause the one or more processors to, in each of the parser instances, apply a same intermediate geographical object record format to data sets having different formats.

BRIEF DESCRIPTION OF THE DRAWINGS

For a detailed description of various examples, reference will now be made to the accompanying drawings in which:

FIG. 4 shows a flow diagram for a method for data format conversion in an elastic data ingestion system in accordance with the present disclosure;

FIG. 5 shows a flow diagram for a method for exporting data to a tenant in an elastic data ingestion system in accordance with the present disclosure.

DETAILED DESCRIPTION

Figure 1A:
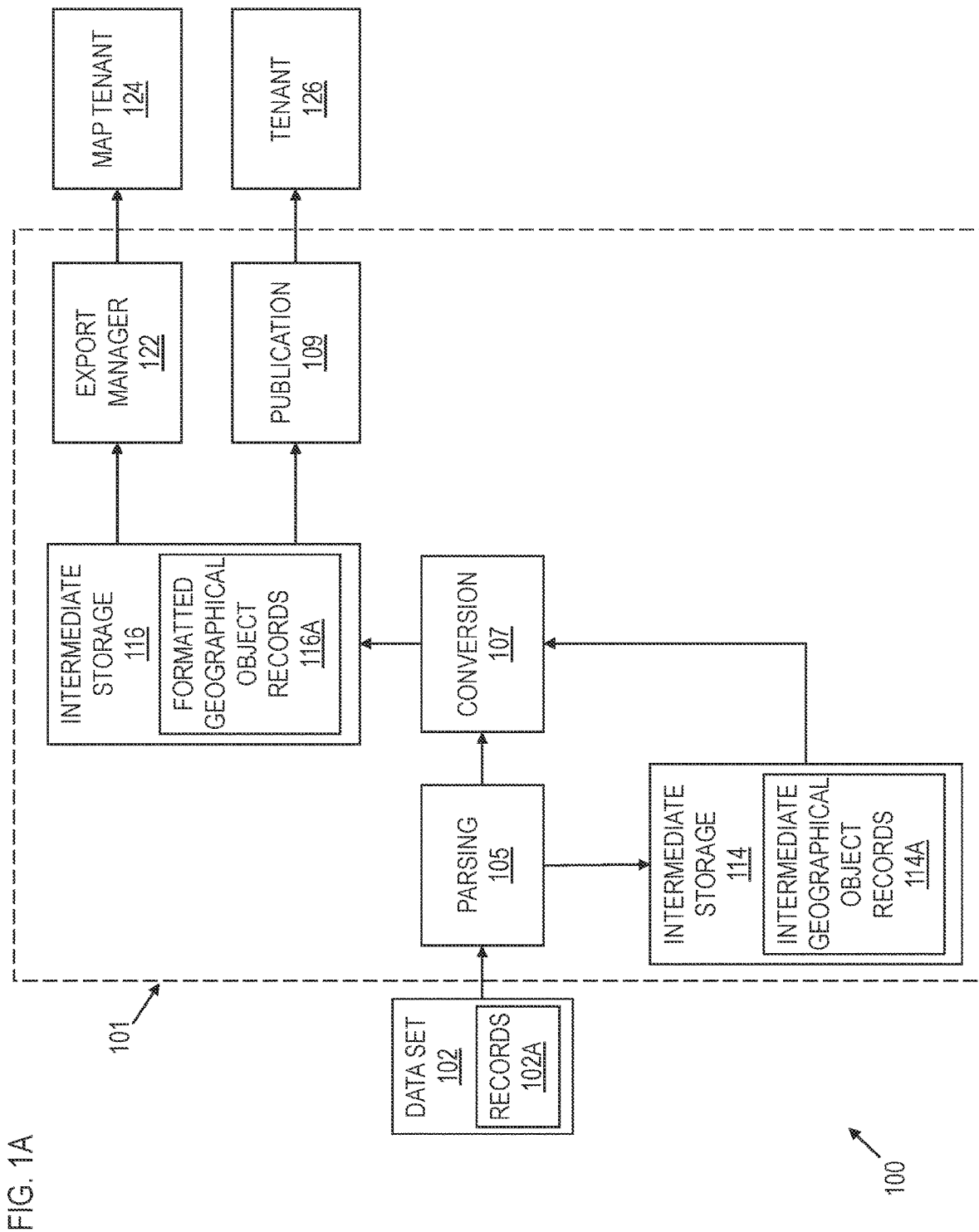
FIG. 1A shows a block diagram for an energy exploration system that includes an elastic data ingestion system for inputting data in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Ingestion of the vast and varied data useful in an energy exploration system is subject to a number of issues. For example:

Data can be provided by any number vendors with different organization and attributes.

Data provided for ingestion may be incomplete or incorrect.

Data may be provided in various formats, such as text strings or numeric values.

Spatial data may be represented using different coordinate reference systems.

Occurrence of a fault in a computing resource during data ingestion may result in loss of data or require re-initiation of ingestion.

Data or metadata may be missing or incorrect.

Ingestion of multiple data sets may be slow if ingested sequentially.

Providing a data set to different data sinks or tenants may require that the data set be ingested separately for each sink or tenant.

The data ingestion system disclosed herein addresses the foregoing issues. The data ingestion system sub-divides the ingestion process into parsing, conversion, and export phases. In the parsing phase, the data ingestion system partitions an input data set into a plurality of subsets, and assigns each subset to a different parser instance for encoding. The parser instances encode the records of the subset as intermediate format records referred to herein as intermediate geographical object records, and convert geographic data to a standard coordinate reference system. In the conversion phase, the data ingestion system assigns multiple conversion instances to format the intermediate geographical object records for export to a specific data sink as formatted geographical object records with unit, date/time and other conversions. In the export phase, the formatted geographical object records are exported to a tenant by multiple publication instances.

An error in data or a fault in one parser, conversion, or publication instance has no effect on other parser, conversion, or publication instances, thereby reducing the impact of data errors, incomplete data, and computing resource faults. In response to a computing resource fault, data being processed by a faulty parser, conversion, or publication instance may be reassigned to a different parser, conversion, or publication instance. Multiple data sets may be ingested simultaneously by executing multiple instances of the data ingestion system. The data ingestion system allows for correction of data or metadata by manual amendment, with inclusion of the amendments in the formatted geographical object records. Thus, implementations of the data ingestion system disclosed herein reduce the time and increase the accuracy and reliability of data input to an energy exploration system.

FIG. 1A shows a block diagram for an energy exploration system 100 that includes an elastic data ingestion system 101 for inputting data in accordance with the present disclosure. The elastic data ingestion system 101 includes a parsing subsystem 105, a conversion subsystem 107, a publication subsystem 109, intermediate storage 114, intermediate storage 116, and an export manager 122. The parsing subsystem 105 examines the records 102A of a data set 102 to be ingested and selects a parsing strategy to use for ingesting the data set 102. In some parsing strategies, the parsing subsystem 105 partitions the data set 102 into multiple data subsets, where each data subset includes one or more of the records 102A. Generally, the parsing subsystem 105 selects a parsing strategy based on attributes of the data set 102. For example, if the data set 102 is binary, then parsing subsystem 105 may process the data set 102 as a single workload. If the data set 102 contains distributable entries, then the parsing subsystem 105 may consider the IO penalty of the data set 102. If the data set 102 is large and takes a long time to download/open, then parsing subsystem 105 may subdivide the data set 102 into larger workloads (e.g., 1000 records 102A divided into two subsets of 500 records 102A each). If the data set 102 is small, meaning IO overhead is relatively low, then parsing subsystem 105 may subdivide the data set 102 into small subsets (e.g., 1 record 102A per subset).

The parsing subsystem 105 processes the records 102A to generate intermediate geographical object records 114A. The parsing subsystem 105 stores the intermediate geographical object records 114A in the intermediate storage 114. The conversion subsystem 107 reads the intermediate geographical object records 114A from the intermediate storage 114 and processes the intermediate geographical object records 114A to generate the formatted geographical object records 116A. The conversion subsystem 107 stores the formatted geographical object records 116A in the intermediate storage 116.

After the formatted geographical object records 116A have been stored in the intermediate storage 116, the publication system 109 exports the formatted geographical object records 116A to the tenant 126. Similarly, the map export manager 122 may export the formatted geographical object records 116A to a map tenant 124. For example, the map tenant 124 may be MapLarge instance and the map export manager 122 may export the formatted geographical object records 116A to the MapLarge instance.

Figure 1B:
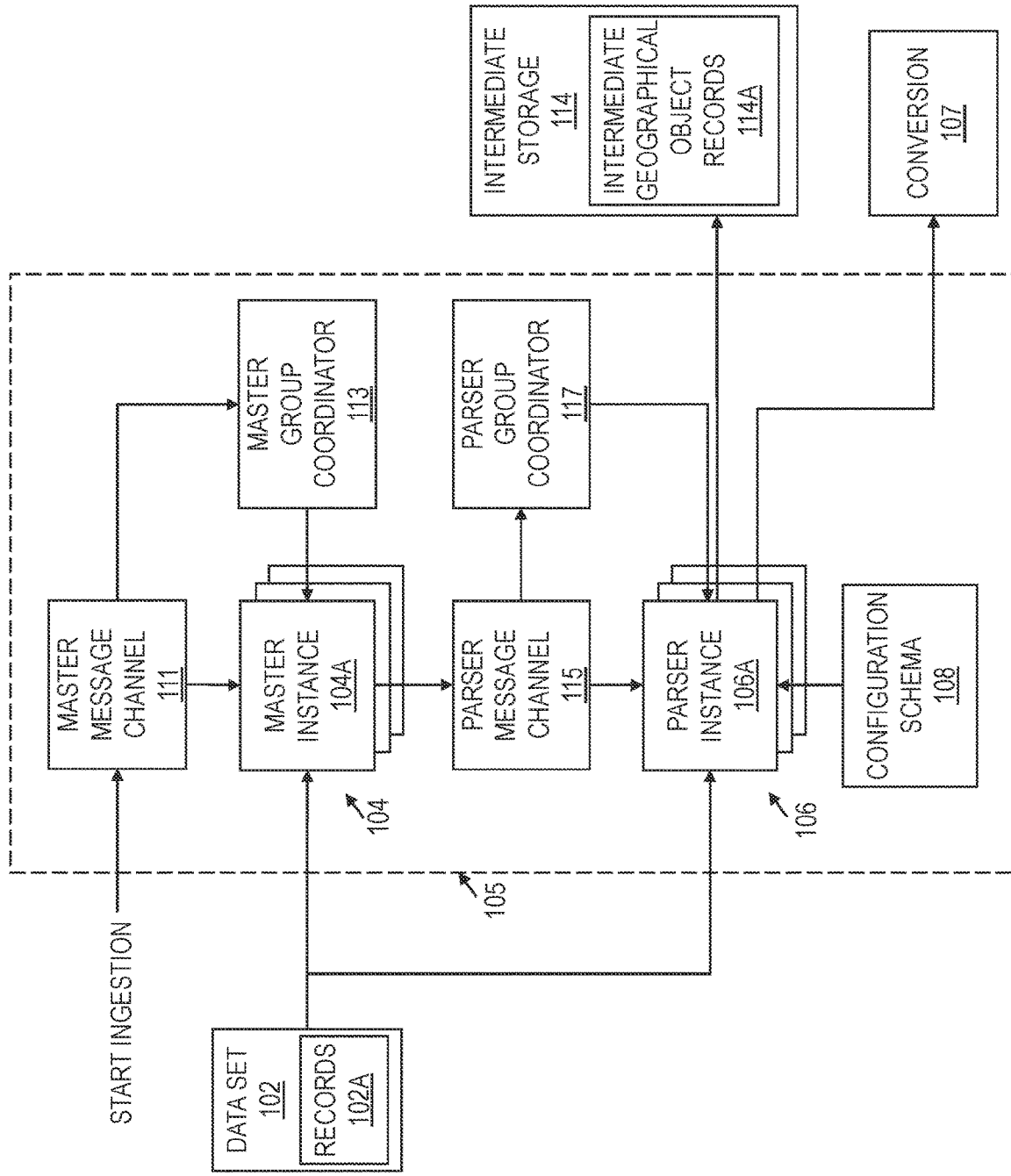
FIG. 1B shows a block diagram for an example parsing subsystem of an elastic data ingestion system in accordance with the present disclosure.

FIG. 1B shows a block diagram for an example parsing subsystem 105 in accordance with the present disclosure. The parsing subsystem 105 includes a master message channel 111, a plurality of master instances 104, a master group coordinator 113, a parser message channel 115, a plurality of parser instances 106, and a parser group coordinator 117. The master message channel 111 stores start ingestion messages provided to initiate ingestion of a data set. One or more of the master instances 104A retrieves a start ingestion message from the master message channel 111, and selects the parsing strategy to be applied to the data set 102. The master message channel 111 may be a queue or other message passing construct. A master instance 104A examines the data set 102 and selects a parsing strategy based on the content of the data set 102.

The master group coordinator 113 monitors the master message channel 111 and controls the number of the master instances 104A applied to process a data set 102 as a function of the number of start ingestion messages stored in the master message channel 111. For example, the master group coordinator 113 may limit the number of the master instances 104A that are applied to process start ingestion messages to a predetermined (e.g., a user determined) percentage of the number of start ingestion messages stored in the master message channel 111. A master instance 104A examines the records 102A of a data set 102 to be ingested and partitions the data set 102 into multiple data subsets, where each data subset includes one or more of the records 102A.

Having partitioned the data set 102, the master instance 104A distributes the data subsets to the parser instances 106 for processing. The master instance 104A distributes the data subsets by storing parse messages in the parser message channel 115. For example, the master instances 104A may store a parse message in the parser message channel 115 for each data subset to be parsed. The parse message may identify the records 102A to be processed. The parser message channel 115 may be a queue or other message passing construct. The parser instances 106 retrieve the parse messages from the parser message channel 115, and process the parse messages.

The parser instance 106A reads the records 102A specified in the parse message from the data set 102 and processes the records 102A based on the configuration schema 108 to generate the intermediate geographical object records. The configuration schema 108 defines the configuration of the data set 102. An example of a configuration schema 108:

```
{
    "type":"FeatureCollection",
    "features":[
        {
            "type":"Feature",
            "geometry":{
                "type":"Point",
                "coordinates":[
                    93.9,
                    11.8
                ]
            },
            "properties":{
                "WELL_NAME":"abc"
            }
        }
    ]
}
```

When the parser instance 106A completes processing of data subset, the parser instance 106A stores the intermediate geographical object records 114A in the intermediate storage 114, and sends a message to the conversion subsystem 107 to initiate formatting of the intermediate geographical object records 114A. Thereafter, the parser instance 106A may retrieve another parser message from the parser message channel 115 and continue processing of the data set 102. The processing performed by the parser instances 106 may include applying the records 102A to populate a standard structure and conversion of location data from a coordinate reference system of the data set 102 to a predetermined coordinate reference system. In some implementations of the elastic data ingestion system 101, the standard structure includes a generic GeoJSON structure, and the predetermined coordinate reference system is the world geodetic system 1984 (WGS84).

An example of the JavaScript Object Notation (JSON) syntax for a shapefile implementation of the data set 102:

```
{
    "source_filename": <your source filepath>,
    "subscription": <the subscription name>,
    "datatype": <the datatype>,
    "data_ecosystem": [p4d|prod],
    "crs_filepath": <your crs filepath>,
    "property_mapping": [
        {
            "source_properties": [{"name": <source property name>}],
            "target_property": <target property name>
        },
        {
            "source_properties": [{"name": <source property name>, "datetime_format": <source datetime format>}],
            "target_property": <target property name>
        },
        {
            "source_properties": [{"name": <source property name>, "source_unit": <source unit>}, {"name": <source property name>, "source_unit": <source unit>},...],
            "target_property": <target property name>
        },...
    ]
}
```

An example of the JSON syntax for xyz implementation of the data set 102:

```
{
    "source_filename": <your source filepath>,
    "subscription": <the subscription name>,
    "datatype": <the datatype>,
    "data_ecosystem": [p4d|prod],
    "property_mapping": [
        {
            "source_properties": [{"name": ["0"|"1"|"2"]}],
            "target_property": ["Longitude", "Latitude", "Value"]
        },
        {
            "source_properties": [{"name": "<survey name>"}],
            "target_property": "SurveyName"
        },...
    ]
}
```

The parser group coordinator 117 monitors the parser message channel 115 and controls the number of the parser instances 106A applied to process the parse messages as a function of the number of parse messages stored in the parser message channel 115. For example, for each parse message stored in the parser message channel 115, the parser group coordinator 117 may activate a parser instance 106A to process the message. The parser message channel 115 may limit the number of the parser instances 106A activated to process the parse messages based on a user specified limit value. For example, the parser group coordinator 117 may limit the number of the parser instances 106A that are applied to process start parse messages to a predetermined (e.g., a user determined) percentage of the number of parse messages stored in the parser message channel 115. More parser instances 106A may be applied to decrease ingestion time at higher cost, and fewer parser instances 106A may be applied to reduce ingestion cost with an increase in ingestion time. Based on a rate of decrease in demand for the parser instances 106A, the parser group coordinator 117 may release/deallocate the parser instance 106A to reduce the quantity of computing resources applied in the elastic data ingestion system 101 and the cost thereof.

Figure 1C:
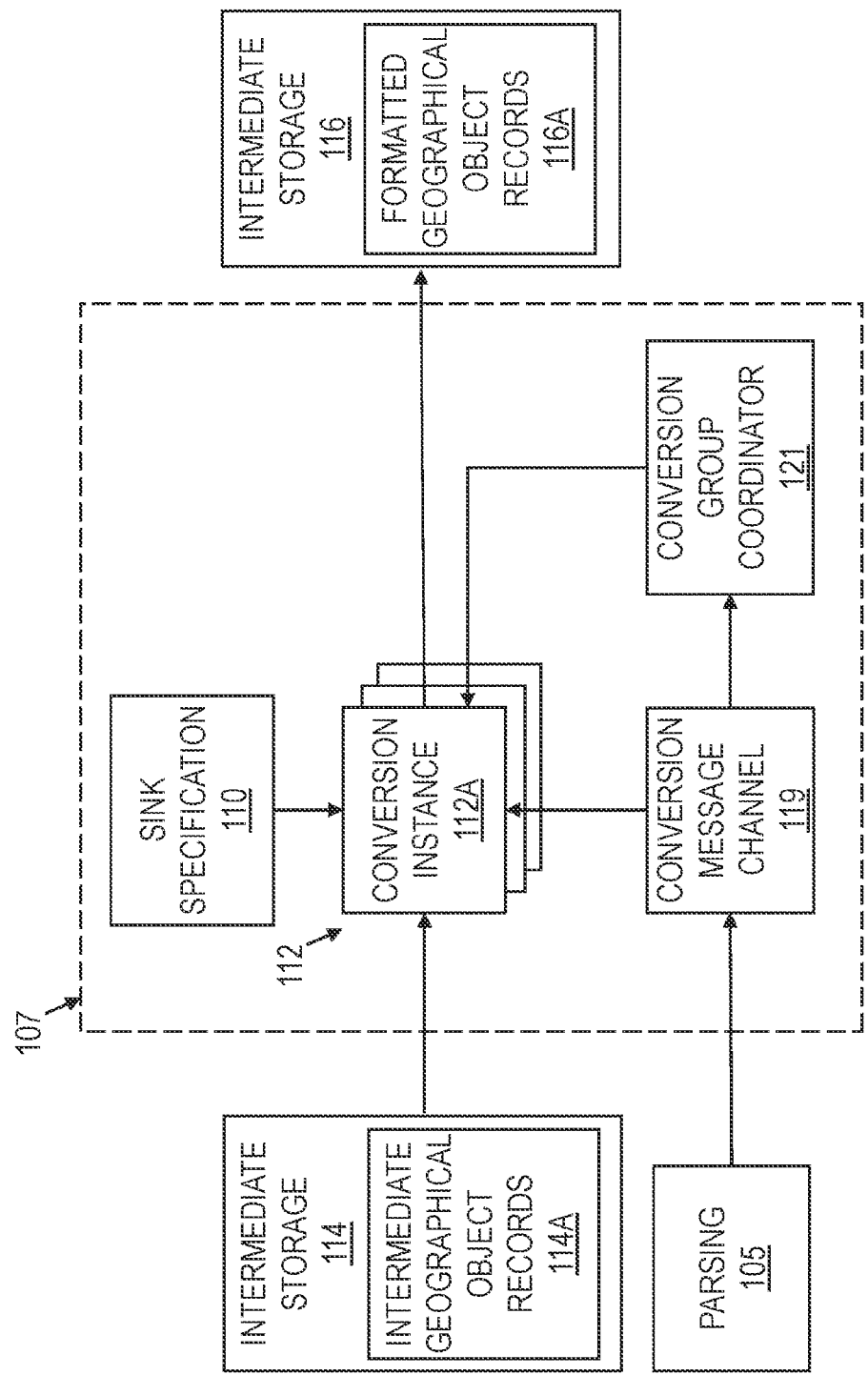
FIG. 1C shows a block diagram for an example conversion subsystem of an elastic data ingestion system in accordance with the present disclosure.

FIG. 1C shows a block diagram for an example conversion subsystem 107 of an elastic data ingestion system in accordance with the present disclosure. The conversion subsystem 107 includes a plurality of conversion instances 112, a conversion message channel 119, and a conversion group coordinator 121. As a parser instance 106A completes processing of a data subset specified by a parse message retrieved from the parser message channel 115, the parser instance 106A writes a conversion message to the conversion message channel 119 to initiate formatting of the intermediate geographical object records 114A. The conversion message may identify the intermediate geographical object records 114A written to the intermediate storage 114 and to be processed by the conversion instances 112. The conversion message channel 119 may a queue or other message passing construct. The conversion instances 112A retrieve the conversion messages from the conversion message channel 119, and process the conversion messages.

A conversion instance 112A reads the intermediate geographical object records 114A specified in the conversion message from the intermediate storage 114 and processes the intermediate geographical object records 114A to generate the formatted geographical object records 116A. The conversion instance 112A stores the formatted geographical object records 116A in the intermediate storage 116. After storing the formatted geographical object records 116A in the intermediate storage 116, the conversion instance 112A may retrieve another conversion message from the conversion message channel 119 and continue processing of the intermediate geographical object records 114A.

The processing performed by the conversion instances 112 may include reformatting the information encoded in an intermediate geographical object record 114A in accordance with a sink specification 110. The sink specification 110 defines a format of the information suitable for use in a given sink device (e.g., the tenant 126). The sink specification 110 may define the format using JavaScript object notation. The reformatting may include mapping of fields of the intermediate geographical object record 114A to fields of the formatted geographical object records 116A, conversion of units applied in fields of the intermediate geographical object records 114A to units applied in fields of the formatted geographical object records 116A, conversion of date-time values applied in fields of the intermediate geographical object records 114A to date-time values applied in fields of the formatted geographical object records 116A, etc. In some implementations, the conversion instances 112A or multiple instances of the conversion instances 112A may apply different sink specifications 110 to generate different formatted geographical object records 116A for different instances of the tenant 126 (different sink devices).

The conversion group coordinator 121 monitors the conversion message channel 119 and controls the number of the conversion instances 112A applied to process the conversion messages as a function of the number of conversion messages stored in the conversion message channel 119. For example, for each conversion message stored in the conversion message channel 119, the conversion group coordinator 121 may activate a conversion instance 112A to process the message. The conversion group coordinator 121 may limit the number of the conversion instances 112A activated to process the conversion messages based on user specified limit value. For example, the conversion group coordinator 121 may limit the number of the conversion instances 112A that are applied to process conversion messages to a predetermined (e.g., a user determined) percentage of the number of conversion messages stored in the conversion message channel 119. More conversion instances 112A may be applied to decrease ingestion time at higher cost, and fewer conversion instances 112A may be applied to reduce ingestion cost with an increase in ingestion time. Based on a rate of decrease in demand for the conversion instances 112A, the conversion group coordinator 121 may release/deallocate the conversion instance 112A to reduce the quantity of computing resources applied in the elastic data ingestion system 101 and the cost thereof.

Figure 1D:
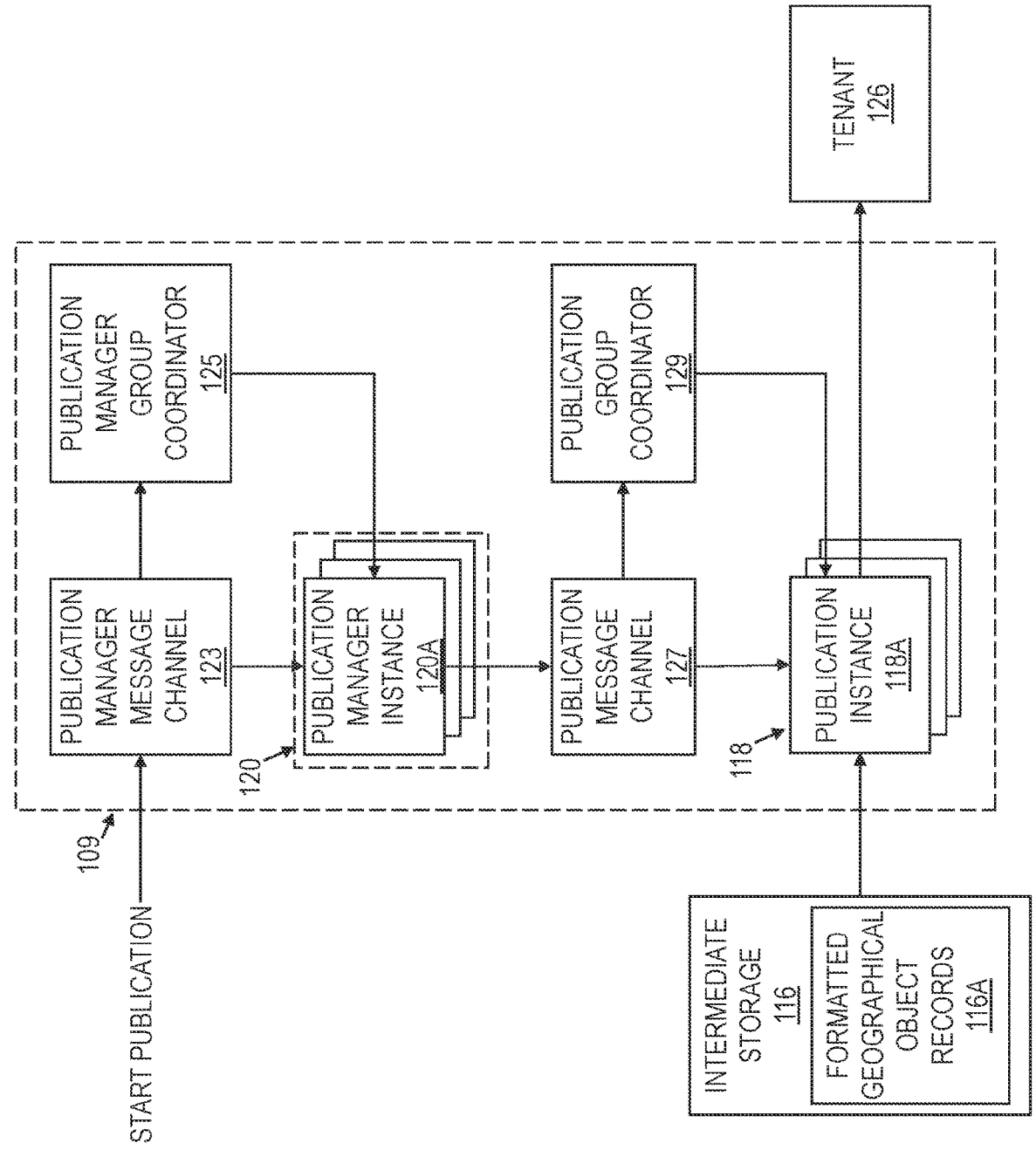
FIG. 1D shows a block diagram for an example publication subsystem of an elastic data ingestion system in accordance with the present disclosure.

FIG. 1D shows a block diagram for an example publication subsystem 109 of an elastic data ingestion system 101 in accordance with the present disclosure. The publication subsystem 109 includes a plurality of publication manager instances 120, a publication manager message channel 123, a publication manager group coordinator 125, a publication message channel 127, a plurality of publication instances 118, and a publication group coordinator 129.

The publication manager message channel 123 stores start publication messages provided to initiate publication of a formatted geographical object records 116A. One or more of the publication manager instances 120A retrieves a start publication message from the publication manager message channel 123. The publication manager message channel 123 may be a queue or other message passing construct. The start publication message may identify the formatted geographical object records 116A to be exported and the tenant 126 to which the formatted geographical object records 116A are to be exported.

The publication manager group coordinator 125 monitors the publication manager message channel 123 and controls the number of the publication manager instances 120A applied to process the start publication messages as a function of the number of start publication messages stored in the publication manager message channel 123. For example, the publication manager group coordinator 125 may limit the number of the publication manager instances 120A that are applied to process start publication messages to a predetermined (e.g., a user determined) percentage of the number of start publication messages stored in the conversion message channel 119. The publication manager group coordinator 125 may limit the number of the publication manager instances 120A activated to process the start publication messages based on user specified limit value. The publication manager instances 120A generate publication messages to transfer the formatted geographical object records 116A to the tenant 126.

The publication manager instance 120A writes the publication messages to the publication message channel 127. Each publication message may identify the particular formatted geographical object records 116A to be transferred and the tenant 126 to which the formatted geographical object records 116A are to be transferred. The number of publication messages written to the publication message channel 127 may be a function of the number of the formatted geographical object records 116A to be exported. For example, the publication manager instances 120A may store a publication message in the parser group coordinator 117 for each formatted geographical object records 116A to be exported.

The publication instances 118A read the publication messages from the publication message channel 127. In response to a publication message, a publication instance 118A reads the formatted geographical object records 116A identified in the publication message from the intermediate storage 116 and transfers the formatted geographical object records 116A to the tenant 126. After transferring the formatted geographical object records 116A, the publication instance 118A may retrieve another publication message from the publication message channel 127 and continue processing of the formatted geographical object records 116A.

The publication group coordinator 129 monitors the publication message channel 127 and controls the number of the publication instances 118A applied to process the publication messages as a function of the number of publication messages stored in the publication message channel 127. For example, the publication group coordinator 129 may limit the number of the publication instances 118A that are applied to process publication messages to a predetermined (e.g., a user determined) percentage of the number of publication messages stored in the publication message channel 127. The publication group coordinator 129 may limit the number of the publication instances 118A activated to process the publication messages based on user specified limit value. More of the publication instances 118A may be applied to decrease ingestion time at higher cost, and fewer publication instances 118A may be applied to reduce ingestion cost with an increase in ingestion time. When export is complete, the publication group coordinator 129 may release/deallocate the publication instances 118A to reduce the quantity of computing resources applied in the elastic data ingestion system 101, and the cost thereof.

Similarly, the map export manager 122 may export the formatted geographical object records 116A to a map tenant 124. For example, the map tenant 124 may be MapLarge instance and the map export manager 122 may export the formatted geographical object records 116A to the MapLarge instance.

Figure 2:
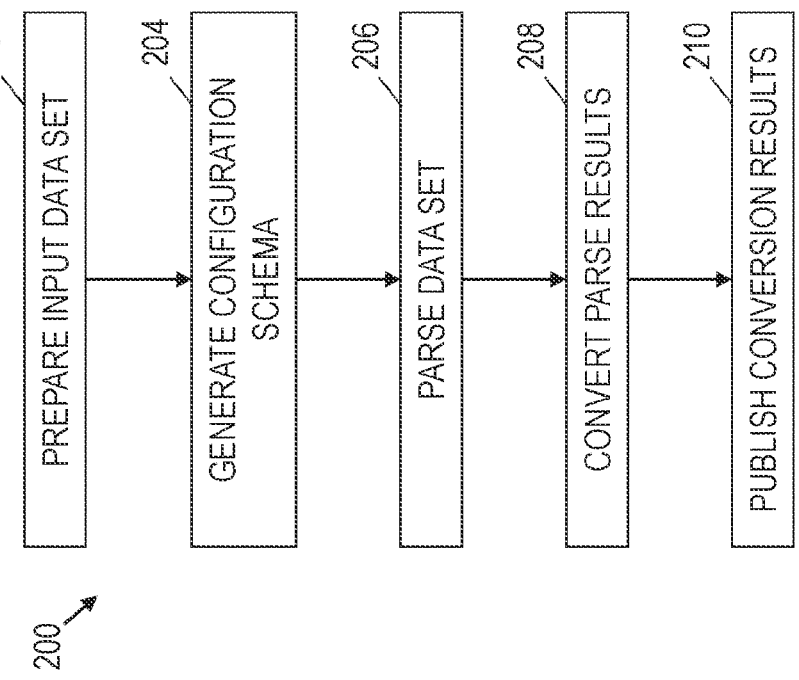
FIG. 2 shows a flow diagram for a method for elastic data ingestion in accordance with the present disclosure.

FIG. 2 shows a flow diagram for a method 200 for elastic data ingestion in accordance with the present disclosure. Though depicted sequentially as a matter of convenience, at least some of the actions shown can be performed in a different order and/or performed in parallel. Additionally, some implementations may perform only some of the actions shown. Operations of the method 200 may be performed by an implementation of the elastic data ingestion system 101.

Computer resources (e.g., computing nodes) of a distributed computing system, such as a cloud computing system, are configured to provide, the parsing subsystem 105, the conversion subsystem 107, the publication subsystem 109, the intermediate storage 114, the intermediate storage 116, and/or the map export manager 122.

In block 202, the data set 102 is prepared for ingestion. The preparation includes ensuring that the data set 102 is an appropriate type of file, for example, a shapefile, an xyz file, or a data file (a plain text file) including well data from the Bureau of Ocean Energy Management (BOEM). A shapefile is an Esri vector data storage format for storing the location, shape, and attributes of geographic features. A shapefile is stored as a set of related files with different extensions, including .shp, .shx, .dbf, .prj, .sbn, .sbx, .fbn, .fbx, .ain, .aih, .ixs, .mxs, .atx, .shp, .xml, .cpg, and .qix. The shapefile format can describe vector features: points, lines, and polygons, representing a wide variety of geospatial objects.

An xyz file is a plain text format. It is used for surface datatypes such as bathymetry, magnetic or gravity. Each line in the file contains 3 columns. The first column is longitude of the point. The second column is latitude of the point. The third column contains the value of that point.

In block 204 the configuration schema 108 is prepared. The configuration schema 108 defines the structure and organization of the data set 102.

In block 206, the elastic data ingestion system 101 parses the data set 102 to provide the information of the data set 102 in the generic form of the intermediate geographical object records 114A. Further detail regarding parsing operation is provided below by reference to FIG. 3.

In block 208, the elastic data ingestion system 101 processes the parse results (the intermediate geographical object records 114A) generated in block 206 to produce the formatted geographical object records 116A suitable for export to the map tenant 124, the tenant 126, or other devices or systems. Further detail regarding conversion operation is provided below by reference to FIG. 4.

In block 210, the publication subsystem 109 exports (publishes) the formatted geographical object records 116A to one or more tenant 126 for use in energy exploration. The tenant 126 may present the formatted geographical object records 116A on a map display, in conjunction with other data, for use in assessing geographic areas for energy exploration or production. Further detail regarding export operation is provided below by reference to FIG. 5.

Figure 3:
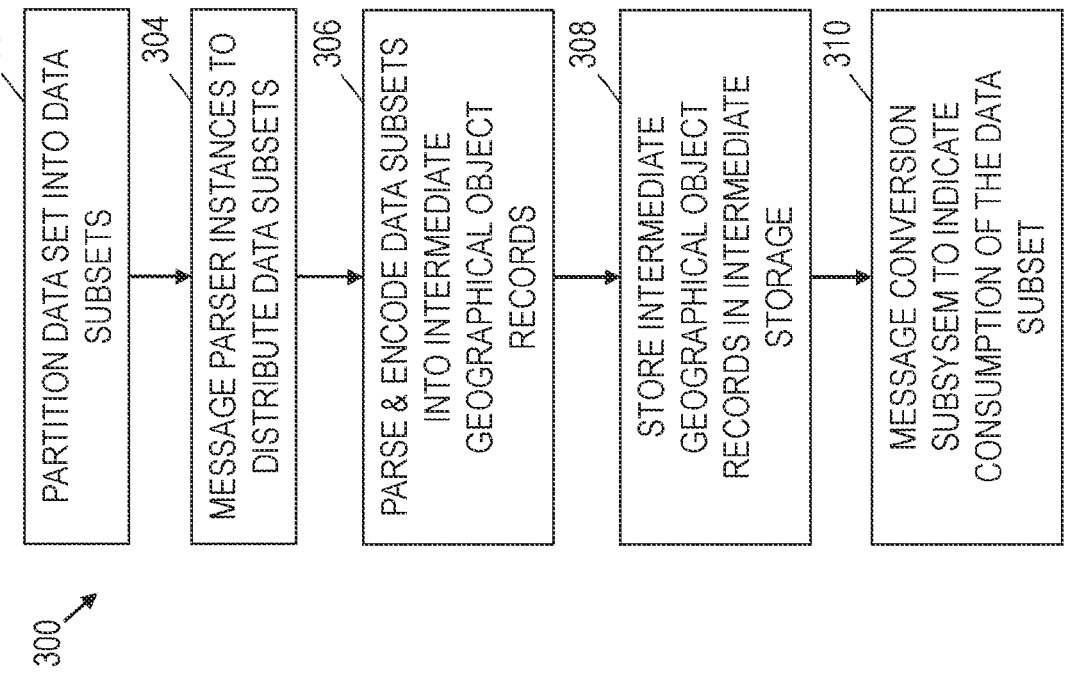
FIG. 3 shows a flow diagram for a method for parsing data in an elastic data ingestion system in accordance with the present disclosure.

FIG. 3 shows a flow diagram for a method 300 for parsing data in an elastic data ingestion system in accordance with the present disclosure. Though depicted sequentially as a matter of convenience, at least some of the actions shown can be performed in a different order and/or performed in parallel. Additionally, some implementations may perform only some of the actions shown. Operations of the method 300 may be performed as part of the operations of block 206 of the method 200.

In block 302, the master instances 104 select a parsing strategy based on the content of the data set 102, and partition the data set 102 into multiple subsets. For example, the master instances 104 may subdivide the data set 102 into subsets, where each subset includes one, two, three, or any other number of the records 102A. The number of subsets may be based on the selected parsing strategy.

In block 304, the master instances 104 transfer parse messages to the parser message channel 115 to distribute the data subsets to the parser instances 106 for parsing. The parser messages identify the records 102A to be parsed by a parser instance 106A and to initiate parsing of the records 102A by the parser instance 106A.

In block 306, each of the parser instances 106A retrieves a parser message from the parser message channel 115 and parses and encodes the records 102A identified in the parser message to produce the intermediate geographical object records 114A. The parsing includes extracting values from the fields of the data set 102 in accordance with the configuration schema 108. The encoding includes converting the values read from the records 102A to units of a corresponding field of the intermediate geographical object records 114A, and populating the fields of the intermediate geographical object records 114A.

In block 308, the parser instances 106A performing the parsing/encoding store the intermediate geographical object records 114A in the intermediate storage 114.

In block 310, each parser instance 106A, when processing of the data subset of the data set 102 assigned by the parser message is complete, sends a message to the conversion subsystem 107 to notify the conversion subsystem 107 that the parsing/encoding of the data subset is complete and the intermediate geographical object records 114A are available to be formatted.

FIG. 4 shows a flow diagram for a method 400 for data format conversion in an elastic data ingestion system in accordance with the present disclosure. Though depicted sequentially as a matter of convenience, at least some of the actions shown can be performed in a different order and/or performed in parallel. Additionally, some implementations may perform only some of the actions shown. Operations of the method 400 may be performed as part of the operations of block 208 of the method 200.

In block 402, conversion messages are stored in the conversion message channel 119. Each conversion message may identify the intermediate geographical object records 114A to be processed into the formatted geographical object records 116A by the conversion instances 112. The conversion message may also identify the sink specification 110 to be applied in formatting the intermediate geographical object records 114A. The conversion instances 112A retrieve the conversion messages from the conversion message channel 119.

In block 404, a conversion instance 112A retrieves one or more of the intermediate geographical object records 114A identified in the conversion messages from the intermediate storage 114 for processing.

In block 406, the conversion instance 112A formats the intermediate geographical object records 114A to produce the formatted geographical object records 116A. The formatting applied by the intermediate geographical object records 114A includes changing the units applied to the values contained in the fields of the intermediate geographical object records 114A to the units specified in the sink specification 110 for the values, and populating the fields of a structure specified by the sink specification 110.

In block 408, the conversion instance 112A performing the formatting stores the formatted geographical object records 116A in the intermediate storage 116.

FIG. 5 shows a flow diagram for a method for exporting data to a tenant in an elastic data ingestion system in accordance with the present disclosure. Though depicted sequentially as a matter of convenience, at least some of the actions shown can be performed in a different order and/or performed in parallel. Additionally, some implementations may perform only some of the actions shown. Operations of the method 500 may be performed as part of the operations of block 210 of the method 200.

In block 502, the formatted geographical object records 116A are stored in the intermediate storage 116. The publication manager instances 120 distribute the formatted geographical object records 116A to the publication instances 118 for export to the tenant 126. The publication manager instances 120 store publication messages in the publication message channel 127 to trigger one or more of the publication instances 118A to initiate export of the formatted geographical object records 116A.

In block 504, the publication instances 118A retrieve the publication messages from the publication message channel 127. The publication messages may identify the formatted geographical object records 116A to be processed by the publication instances 118A and the tenant 126 to which the formatted geographical object records 116A are to be exported.

In block 506, the publication instances 118A retrieve one or more of the formatted geographical object records 116A from the intermediate storage intermediate storage 116 for processing. The formatted geographical object records 116A retrieved by the publication instances 118A may be identified in the publication messages retrieved from the publication message channel 127.

In block 508, the publication instances 118A export the formatted geographical object records 116A to the tenant 126.

Figure 6:
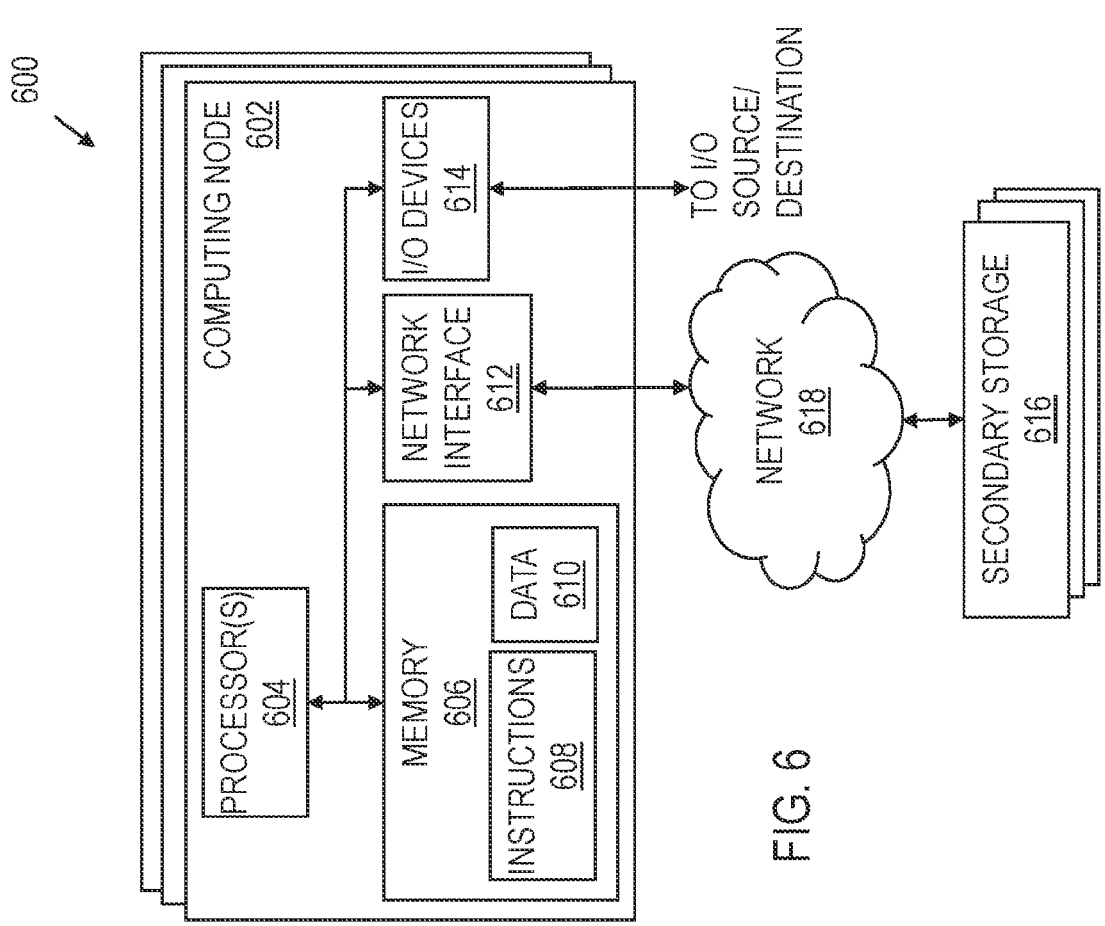
FIG. 6 shows a block diagram for an example computing system suitable for implementation of an elastic data ingestion system in accordance with the present disclosure.

FIG. 6 shows a block diagram for a computing system 600 suitable for implementation of the elastic data ingestion system 101 or the energy exploration system 100. Examples of the computing system 600 may be applied to implement the parsing subsystem 105, the conversion subsystem 107, the publication subsystem 109, the intermediate storage 116, and/or the map export manager 122. The computing system 600 includes one or more computing nodes 602 and secondary storage 616 that are communicatively coupled (e.g., via the network 618). One or more of the computing nodes 602 and associated secondary storage 616 may be applied to provide the functionality of the parsing subsystem 105, the conversion subsystem 107, the publication subsystem 109, the intermediate storage 114, the intermediate storage 116, and/or the map export manager 122 described herein.

Each computing node 602 includes one or more processors 604 coupled to memory 606, a network interface 612, and the I/O devices 614. In various embodiments, a computing node 602 may be a uniprocessor system including one processor 604, or a multiprocessor system including several processors 604 (e.g., two, four, eight, or another suitable number). Processors 604 may be any suitable processor capable of executing instructions. For example, in various embodiments, processors 604 may be general-purpose or embedded microprocessors, graphics processing units (GPUs), or digital signal processors (DSPs) implementing any of a variety of instruction set architectures (ISAs). In multiprocessor systems, each of the processors 604 may commonly, but not necessarily, implement the same ISA.

The memory 606 may include a non-transitory, computer-readable storage medium configured to store program instructions 608 and/or data 610 accessible by processor(s) 604. The memory 606 may be implemented using any suitable memory technology, such as static random-access memory (SRAM), synchronous dynamic RAM (SDRAM), nonvolatile/Flash-type memory, or any other type of memory. Program instructions 608 and data 610 implementing the functionality disclosed herein are stored within memory 606. For example, instructions 608 may include instructions that when executed by processor(s) 604 implement the parsing subsystem 105, the conversion subsystem 107, the publication subsystem 109, the intermediate storage 114, the intermediate storage 116, and/or the map export manager 122 disclosed herein.

Secondary storage 616 may include volatile or non-volatile storage and storage devices for storing information such as program instructions and/or data as described herein for implementing the parsing subsystem 105, the conversion subsystem 107, the publication subsystem 109, the intermediate storage 114, the intermediate storage 116, and/or the map export manager 122. The secondary storage 616 may include various types of computer-readable media accessible by the computing node 602 via the network interface 612. A computer-readable medium may include storage media or memory media such as semiconductor storage, magnetic or optical media, e.g., disk or CD/DVD-ROM, or other storage technologies.

The network interface 612 includes circuitry configured to allow data to be exchanged between the computing node 602 and/or other devices coupled to the network 618. For example, the network interface 612 may be configured to allow data to be exchanged between a first instance of the computing system 600 and a second instance of the computing system 600. The network interface 612 may support communication via wired or wireless data networks.

The I/O devices 614 allow the computing node 602 to communicate with various input/output devices such as one or more display terminals, keyboards, keypads, touchpads, scanning devices, voice or optical recognition devices, or any other devices suitable for entering or retrieving data by one or more computing nodes 602. Multiple input/output devices may be present in a computing system 600.

Those skilled in the art will appreciate that the computing system 600 is merely illustrative and is not intended to limit the scope of embodiments. In particular, the computing system 600 may include any combination of hardware or software that can perform the functions disclosed herein. Computing node 602 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An energy exploration system, comprising:
a plurality of computer nodes, each comprising a processor and memory coupled to the processor, and wherein the processors, when executing instructions stored in the memory, implement a data ingestion system to add a data set to the energy exploration system, the data ingestion system comprising:
a parsing subsystem configured to encode records of the data set as intermediate geographical object records, wherein the parsing subsystem is implemented by one or more of the processors, the parsing subsystem comprising:
a plurality of parser instances configured to encode the records:
a master message channel; and
one or more master instances implemented by the one or more of the processors, the one or more master instances configured to receive an ingestion start message, via the master message channel, to initiate ingestion of the data set and, on receipt of the ingestion start message, to:
select a parsing strategy based on content of the data set;
partition the data set into data subsets comprising one or more records of the data set based on the parsing strategy; and
transmit a parse message for each of the data subsets to the parser instances;
a conversion subsystem comprising a plurality of conversion instances implemented by one or more of the processors, the conversion subsystem configured to format the intermediate geographical object records according to a sink specific specification to produce formatted geographic object records; and
a publication subsystem comprising a plurality of publication instances implemented by one or more of the processors, the publication subsystem configured to export the formatted geographic object records to a designated tenant.

2. The energy exploration system of claim 1, wherein the parsing subsystem further comprises:
a parser message channel for receiving the parse messages transmitted by the one or more master instances; and
a parser group coordinator configured to control a number of the parser instances applied to process the parse messages and encode the data set.

3. The energy exploration system of claim 1, wherein each of the parser instances is configured to:
retrieve one of the parse messages from a parser message channel;
read from the data set one of the data subsets identified in the one of the parse messages;
parse each record of the one of the data subsets according to a configuration schema for the data set;
encode each value parsed from the record as a value of an intermediate geographical object record;
store each of the intermediate geographical object records in a first intermediate storage; and
transmit a conversion message to the conversion subsystem.

4. The energy exploration system of claim 3, wherein the conversion subsystem further comprises:
a conversion message channel for receiving the conversion message transmitted by the parser instance; and
a conversion group coordinator configured to control a number of the conversion instances applied to process the conversion messages and format the intermediate geographical object records.

5. The energy exploration system of claim 4, wherein each of the conversion instances is configured to:
retrieve a conversion message from the conversion message channel;
retrieve from the first intermediate storage, an intermediate graphical geographical object record identified in the conversion message;
format the intermediate geographical object record according to the sink specific specification; and
store the formatted geographic object record in a second intermediate storage.

6. The energy exploration system claim 1, wherein the parser instances are configured to apply a same intermediate geographical object record format to data sets having different formats.

7. The energy exploration system of claim 1, wherein the publication subsystem further comprises:
a publication manager message channel;
a publication manager instance implemented by one or more of the processors, the publication manager configured to:
retrieve a publication start message from the publication manager message channel; and
transmit publication messages to the publication instances;
a publication message channel; and
a publication group coordinator configured to control a number of the publication instances applied to export the formatted geographic object records to the designated tenant.

8. A method for data ingestion, comprising:
configuring a plurality of computing nodes to provide: a parsing subsystem comprising one or more master instances and a plurality of parser instances, a conversion subsystem comprising a plurality of conversion instances, and a publication subsystem comprising a plurality of publication instances;
encoding, by the plurality of parser instances, one or more records of a data set as intermediate geographical object records;
receiving, by the one or more master instances, an ingestion start message, via a master message channel of the parsing subsystem, to initiate ingestion of the data set;
on receipt of the ingestion start message:
selecting, by the one or more master instances, a parsing strategy based on content of the data set;
partitioning, by the one or more master instances, the data set into data subsets comprising one or more records of the data set based on the parsing strategy; and
transmitting, by the one or more master instances, a parse message for each of the data subsets to the parser instances;
converting, by the plurality of conversion instances, the intermediate geographical object records, according to a sink specific specification, to produce formatted geographic object records; and
exporting, by the plurality of publication instances, the formatted geographic object records to a designated tenant.

9. The method of claim 8, further comprising:
generating, by the one or more master instances, a plurality of parser messages each corresponding to one of the data subsets;

storing, by the one or more master instances, the parser messages in a parser message channel;
retrieving, by the plurality of parser instances, the parser messages from the parser message channel; and
retrieving, by the plurality of parser instances, from the data set, the data subsets identified in the parser messages.

10. The method of claim 8, wherein the encoding comprises:
parsing each record of the data subsets according to a configuration schema for the data set;
encoding each value parsed from the record of the data subsets as a value of an intermediate geographical object record;
storing each of the intermediate geographical object records in a first intermediate storage;
generating a conversion message for the data subset; and
storing the conversion message in a conversion message channel.

11. The method of claim 8, wherein the encoding further comprises applying a same intermediate geographical object record format to data sets having different formats.

12. The method of claim 8, wherein the exporting comprises:
retrieving a publication start message from a publication manager message channel;
transmitting, by a publication manager instance, publication messages to the publication instances via a publication message channel; and
retrieving, by the publication instances, the publication messages from the publication message channel.

13. A non-transitory computer-readable medium encoded with instructions that when executed cause one or more processors to:
implement a parsing subsystem comprising one or more master instances and a plurality of parser instances, a conversion subsystem comprising a plurality of conversion instances, and a publication subsystem comprising a plurality of publication instances;
encode, by the plurality of parser instances, one or more records of a data set as intermediate geographical object records;
receive, by the one or more master instances, an ingestion start message, via a master message channel of the parsing subsystem, to initiate ingestion of the data set;
on receipt of the ingestion start message:
select, by the one or more master instances, a parsing strategy based on content of the data set;
partitioning, by the one or more master instances, the data set into data subsets comprising one or more records of the data set based on the parsing strategy; and
transmitting, by the one or more master instances, a parse message for each of the data subsets to the parser instances;
convert, by the plurality of conversion instances, the intermediate geographical object records, according to a sink specific specification, to produce formatted geographic object records; and
export, by the plurality of publication instances, the formatted geographic object records to a designated tenant.

14. The non-transitory computer-readable medium of claim 13, encoded with instructions that when executed cause the one or more processors to:

generate, by the one or more master instances, a plurality of parser messages each corresponding to one of the data subsets;
store, by the one or more master instances, the parser messages in a parser message channel;
retrieve, by the plurality of parser instances, the parser messages from the parser message channel; and
retrieve, by the plurality of parser instances, from the data set, the data subsets identified in the parser messages.

15. The non-transitory computer-readable medium of claim 13, encoded with instructions that when executed cause the one or more processors, in each of the parser instances, to:
parse each record of the data subsets according to a configuration schema for the data set;
encode each value parsed from the record of the data subsets as a value of an intermediate geographical object record;
store each of the intermediate geographical object records in a first intermediate storage;
generate a conversion message for the data set; and
store the conversion message in a conversion message channel.

16. The non-transitory computer-readable medium of claim 15, encoded with instructions that when executed cause the one or more processors, in each of the conversion instances to:
retrieve the conversion message from the conversion message channel;
retrieve, from the first intermediate storage, the intermediate geographical object record identified in the conversion message;
format the intermediate geographical object record according to the sink specific specification; and
store the formatted geographic object record in a second intermediate storage.

17. The non-transitory computer-readable medium of claim 16, encoded with instructions that when executed cause the one or more processors to, in the publication subsystem, to:
retrieve a publication start message from a publication manager message channel;
transmit, by a publication manager instance, publication messages to the publication instances via a publication message channel; and
retrieve, by the publication instances, the publication messages from the publication message channel.

18. The method of claim 10, wherein the converting comprises:
retrieving the conversion message from the conversion message channel;
retrieving, from the first intermediate storage, the intermediate geographical object record identified in the conversion message;
formatting the intermediate geographical object record according to the sink specific specification; and
storing the formatted geographic object record in a second intermediate storage.

19. The method of claim 18, comprising:
receiving the conversion message via the conversion message channel; and
controlling a number of conversion instances applied to process conversion messages and format intermediate geographical object records.

20. The non-transitory computer-readable medium of claim 13, encoded with instructions that when executed cause the one or more processors to, in each of the parser instances, apply a same intermediate geographical object record format to data sets having different formats.

\* \* \* \* \*